(12) United States Patent
Fox et al.

(10) Patent No.: US 8,727,279 B2
(45) Date of Patent: May 20, 2014

(54) METHOD AND SYSTEM FOR CONTROLLING SWAYING OF AN OBJECT

(75) Inventors: Gary L. Fox, Oro Valley, AZ (US); Justin C. Jenia, Tucson, AZ (US); Christopher E. Toal, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1993 days.

(21) Appl. No.: 11/845,912

(22) Filed: Aug. 28, 2007

(65) Prior Publication Data

US 2011/0001007 A1    Jan. 6, 2011

(51) Int. Cl.
*B64C 1/00* (2006.01)

(52) U.S. Cl.
USPC ......................................................... 244/119

(58) Field of Classification Search
USPC .......... 244/3.1, 3.15, 3.16, 17.27, 173.2, 119; 188/378–380; 248/560, 562, 566
See application file for complete search history.

(56) References Cited

U.S. PATENT DOCUMENTS

| | | | | |
|---|---|---|---|---|
| 2,145,280 A | * | 1/1939 | Stitz | 248/556 |
| 2,761,638 A | * | 9/1956 | Getline | 248/556 |
| 3,066,905 A | * | 12/1962 | Gertel | 248/570 |
| 3,625,466 A | * | 12/1971 | Marshall et al. | 248/626 |
| 5,890,569 A | * | 4/1999 | Goepfert | 188/378 |
| 5,918,865 A | * | 7/1999 | Osterberg | 267/221 |
| 5,947,240 A | * | 9/1999 | Davis et al. | 188/378 |
| 6,578,682 B2 | | 6/2003 | Braman et al. | |
| 6,871,561 B2 | | 3/2005 | Denice, Jr. et al. | |

FOREIGN PATENT DOCUMENTS

| | | |
|---|---|---|
| EP | 1342990 | 9/2003 |
| GB | 1396411 | 6/1975 |
| JP | 53-127904 A | 11/1978 |
| JP | 11-278063 A | 10/1999 |
| JP | 11-301599 A | 11/1999 |
| JP | 2000-289698 A | 10/2000 |
| JP | 2002-245091 A | 8/2002 |
| JP | 2007-277290 A | 10/2007 |
| JP | 2009-100649 A | 5/2009 |
| JP | 2010-184077 A | 8/2010 |
| WO | 9922161 | 5/1999 |

OTHER PUBLICATIONS

International Search Report and Written Opinion from corresponding International Application No. PCT/US08/70706.
Fox, Gary L., "Matrix Methods for the Analysis of Elastically Supported Isolation Systems", The Shock and Vibration Bulletin, (1976), Washington, D.C., Bulletin 46, pp. 135-145.
Office Action from corresponding Japanese Application No. 2010-523001, mailed on Dec. 11, 2012.

* cited by examiner

*Primary Examiner* — Valentina Xavier
(74) *Attorney, Agent, or Firm* — Renner, Otto, Boisselle & Sklar, LLP (57) ABSTRACT

A method of configuring a mount or of controlling sway in an object to be mounted includes configuring isolators of the mount to put a center of elasticity of the flexible mount at a desired height relative to a base of the mount. This desired distance may be at a location of expected minimum clearance between the object to be mounted and the structure expected to surround the object to be mounted and is the center of rotation of the flexible mount. The location of the center of elasticity also may be farther from the base than a center of mass or gravity of the object to be mounted. An equation relating the location of the center of elasticity as a function of isolator material properties and of angle between the isolators and the base may be used to analytically predict the location of the center of elasticity and the center of rotation.

9 Claims, 5 Drawing Sheets

METHOD AND SYSTEM FOR CONTROLLING SWAYING OF AN OBJECT

BACKGROUND OF THE INVENTION

1. Technical Field of the Invention

The invention relates to systems and methods of controlling sway in objects flexibly attached to a planar or other base.

2. Description of the Related Art

A common problem in mounting objects is controlling movement of objects mounted to a plate or other base. One example of such a problem is in mounting a vehicle engine. Another example is mounting a missile payload in a missile nose cone. In the second example the payload components are ordinarily mounted to a plate at the aft end of the missile nose cone. In both situations a rigid object is mounted at only one end, and is not secured at their other ends.

Such mountings generally utilize resilient materials to reduce the propagation of vibrations into the rigid object, and to reduce sway caused by lateral forces, for example having a component parallel to the plane of a mounting plate.

One goal in configuring prior mounting devices has been to provide the most control of vibration and sway at a location along the interface between the mounting device and the object to be mounted. Another approach has been to use trial and error to place the center of the elasticity of the mounting system at the same or a similar point as a center of mass or center of gravity of the object to be mounted.

For the foregoing it would be appreciated that improvements with regard to mounting systems would be desirable.

SUMMARY OF THE INVENTION

According to an aspect of the invention, an elastic center of a flexible mount is deliberately located to be away from a base of the mount to which an object is to be attached.

According to another aspect of the invention, a method of configuring a flexible mount for receiving an object to be mounted, includes the steps of: choosing a desired location of least sway for the mount; and configuring isolators of the mount to locate a center of elasticity of the flexible mount such that a center of rotation is at the location of least sway, wherein the configuring includes using an equation that relates a location of the center of elasticity and the center of rotation as a function of material characteristics of the isolators.

According to yet another aspect of the invention, a method of controlling swaying of an object, including the steps of: configuring isolators of a flexible mount to place a center of elasticity of the isolators at a distance away from a base of the flexible mount corresponding to a center of rotation at an expected minimum clearance between an object to be mounted on the base, and structure around the object; wherein the configuring includes using a mathematical analytical method to configure the isolators; and mounting the object onto the base.

According to still another aspect of the invention, a mounting system includes: a flexible mount, wherein the mount includes a base and isolators connected to the base; and an object mounted to the base. The isolators define a center of elasticity relative to the base that as a function of material characteristics of the isolators and orientation of the isolators relative to the base. The center of elasticity of the isolators is farther from the base than a center of mass of the object.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A method of configuring a mount or of controlling sway in an object to be mounted includes configuring isolators of the mount to put a center of elasticity and a center of rotation of the mount at a desired height relative to a base of the mount. The isolators may be configured by choosing materials of the isolators and an angle between the isolators and the base of the mount. The configuration of the isolators may be used to set a center of elasticity, and therefore the center of rotation, of the mounting system at a desired distance from the base of the mount. This desired distance may be at a location of expected minimum clearance between the object to be mounted and the structure expected to surround the object to be mounted. In other words, the location of the center of rotation may be at a distance from the base that corresponds to an expected smallest gap between the object to be mounted and structure around the object to be mounted. In still other words, the isolators may be configured such that the center of rotation is at a location of desired minimum sway of the object to be mounted. The location of the center of elasticity also may be farther from the base than a center of mass or gravity of the object to be mounted. An equation relating the location of the center of elasticity as a function of isolator material properties and of angle between the isolators and the base may be used to analytically predict the location of the center of elasticity and the center of rotation. By using analytical tools the mount may be configured in a more effective and less expensive way. Also, the ability to control better where sway of an object to be mounted is minimized can be used to reduce the gap needed between the object and structure around the object. This can result in better utilization of space within an enclosure for receiving an object or payload. In applications where space is limited, such as a rocket or projectile nose cone, this method provides substantial advantage.

Figure 1:
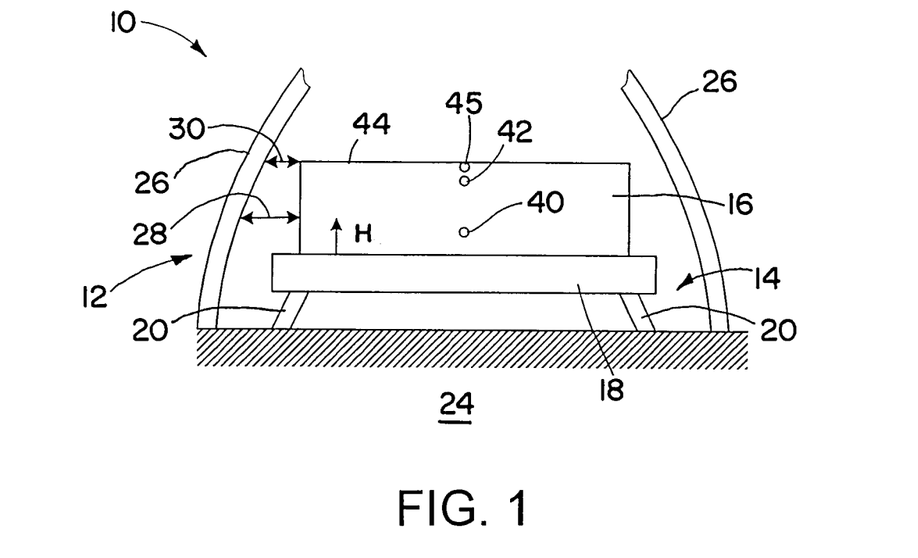
FIG. 1 is a schematic view of a mounting system in accordance with an embodiment of the present invention.

Referring initially to FIG. 1, a device 10 includes a mounting system 12, which in turn includes a flexible mount 14 for securing an object to be mounted 16. The flexible mount 14 includes a base 18 and one or more isolators 20. The flexible mount 14 is used to secure the object 16 to a foundation 24.

The mount 14 provides the primary structural anchor for the object 16. That is, the object 16 is mainly supported by its connection to the base 18, although it may have more minor mechanical connections to other parts of the device 10.

The device 10 may be a stationary or mobile apparatus, and the foundation 24 may be an integral part of the device 10. The device 10 also includes a structure 26, such as a housing, that is in part or in whole around the object 16. A gap 28 is defined as the space between the object 16 and the structure 26. A gap height 28 is the distance from the base 18 to the gap 28. It will be appreciated that the gap 28 varies with the height H (distance away from the base 18), depending upon at least the configuration of the structure 16 and the size and shape of the object 16. At some value of the height H there is a minimum gap 30 between the object 16 and the structure 26.

The flexible mount 14 has been described heretofore in general terms, and will be appreciated that a large variety of configurations are possible. The base 18 may be a plate, or may alternatively be any of variety of suitable types of structures for receiving and anchoring the object 16. The isolators 20 may be a plurality of isolators, for example being three or four isolators axis symmetrically spaced about a circular base 18. The object 16 may be secured to the base 18 by any of a variety of suitable mechanical connections, one example of which is the use of threaded fasteners such as bolts.

One function of the flexible mount 14 is to secure the object 16 such that the object 16 does not contact the structure or housing 26 when the object 16 sways under the effect of lateral forces or accelerations (forces or accelerations having a component parallel to the base 18). Forces due to lateral acceleration of the base act on the object 16 effectively act at a center of mass or gravity 40. Reaction forces from the isolators 20 act about a center of elasticity 42. The reaction at the elastic center causes a restoring moment. The combination of lateral displacement and rotation creates a point above the center of elasticity (further from the base 18) where there is zero net lateral motion; only rotation occurs at this point. The point of where only rotation occurs is termed the center of rotation. The center of rotation 45 is the level above the base 18 that undergoes zero ideal sway displacement in response to lateral forces on the object 16. It is advantageous to locate the center of rotation 45 at substantially the same height H, relative to the base 18, as the minimum gap 30 between the object 16 and the structure or housing 26. The center of elasticity 42 may be located above the center of mass 40 (farther from the base 18 than the center of mass 40). The elastic center 42 can be placed at a height that is within the object 16. Alternatively, the elastic center 42 may be placed above the object 16 (farther from the base 18 than a distal end 44 of the object 16). In addition, the center of rotation 45 will be above the center of elasticity 42.

It will be appreciated that the device 10 may be any of a wide variety of devices utilizing sway or vibration control. Two specific examples discussed herein are a vehicle engine mount and a missile payload mount. However, there are a very wide variety of other possible devices, structures, base configurations, etc. The base 18 and the isolators 20 may be made of any of a wide variety of materials. The isolators 20 may be made of any of a variety of resilient materials, such as flexible polymeric materials. The isolators 20 may be elastic elements that include elastomers.

Figure 2:
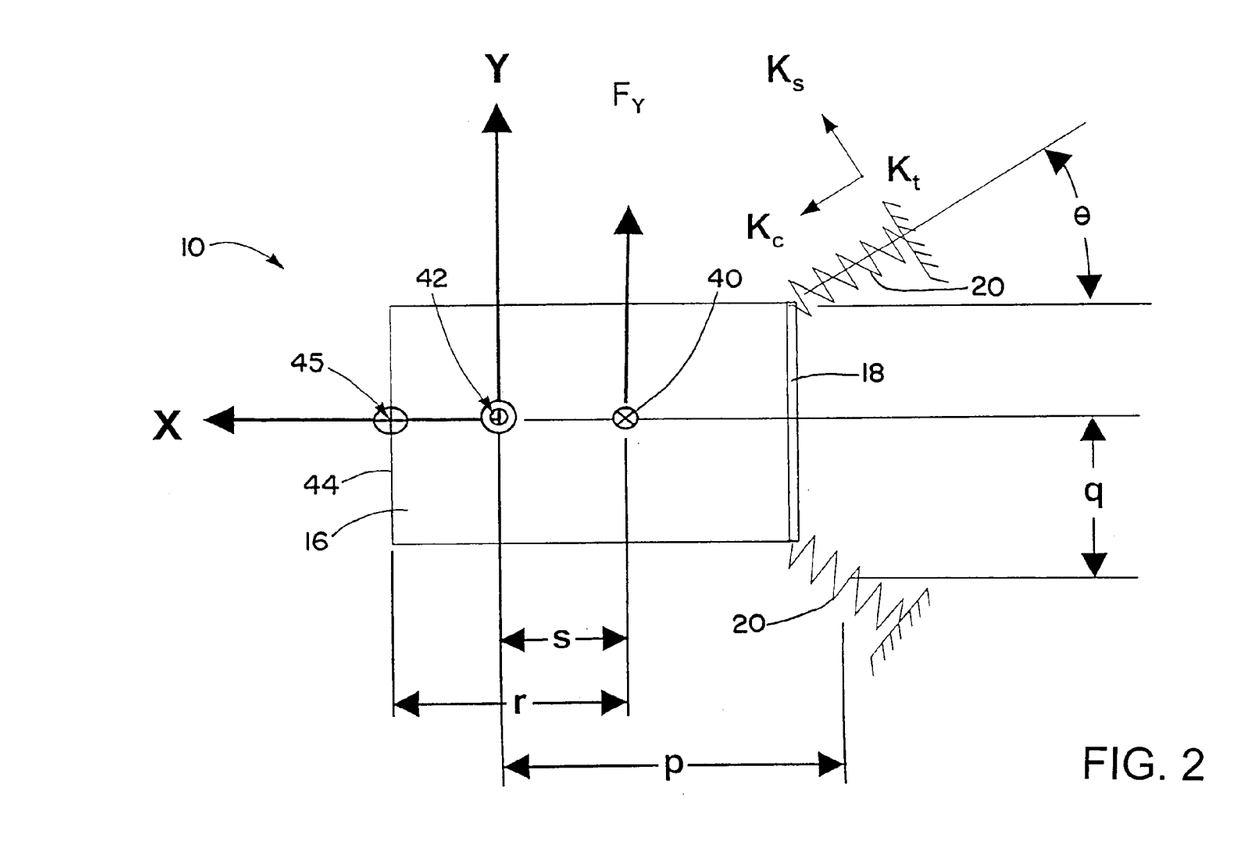
FIG. 2 is an illustration regarding a method for configuring a mount, in accordance with an embodiment of the present invention.

With reference to FIG. 2, description is now given of an analytical method for determining position of the center of elasticity 42 as a function of material properties of the isolators 20, and of the angle θ of the isolators 20 relative to the base 18. The center of rotation 45 is then found from inverting the stiffness matrix at the elastic center and imposing the constraint of zero lateral motion. The relationship between displacement of the isolators 20 and forces on the isolators 20 may be represented as a stiffness matrix K:

$$[K] = \begin{bmatrix} K_{xx} & K_{xr} \\ K_{rx} & K_{rr} \end{bmatrix} \quad (1)$$

Here the various elements K represent constants of response of an individual isolator in translation (x) and rotation (r). For a generalized three-dimensional translation and rotation the stiffness matrix [K] is a 6×6 matrix. Equation (1) represents the 6×6 matrix partitioned into 4 sub-matrices, each 3×3 in size. The upper right and lower left sub-matrices form the coupling terms between translations and rotations. These sub-matrices are also the transpose of each other due to the symmetry of [K].

The relationship between forces F and displacements δ are given as follows:

$$\begin{bmatrix} F_x \\ F_y \\ F_z \\ F_\alpha \\ F_\beta \\ F_\gamma \end{bmatrix} = \begin{bmatrix} K_{xx} & K_{xr} \\ K_{rx} & K_{rr} \end{bmatrix} \begin{bmatrix} \delta_x \\ \delta_y \\ \delta_z \\ \delta_\alpha \\ \delta_\beta \\ \delta_\gamma \end{bmatrix} \quad (2)$$

Here the subscripts x, y, and z represent displacements and forces in x-, y-, and z-directions, and the subscripts α, β, and γ represent moments and rotational displacements about the x-, y-, and z-axes.

As a practical matter, the rotation terms in the element stiffness matrix can be neglected without sacrificing accuracy. Thus the element stiffness matrix $K_1$ of one of the isolators 20 may be represented as follows:

$$K_i = \begin{pmatrix} K_{1s} & 0 & 0 & 0 & 0 & 0 \\ 0 & K_{1t} & 0 & 0 & 0 & 0 \\ 0 & 0 & K_{1c} & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} \quad (3)$$

$$= \begin{pmatrix} K_{1s} & 0 & 0 & 0 & 0 & 0 \\ 0 & bK_{1s} & 0 & 0 & 0 & 0 \\ 0 & 0 & aK_{1s} & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$$

Here $K_{1s}$, $K_{1t}$, and $K_{1c}$ represent the spring constant in shear, tangential, and compression, respectively. The stiffness ratio of compression to shear is represented as $a=K_c/K_s$. The stiffness ratio of tangential to shear is represented as $b=K_t/K_s$.

A series of transformations may then be defined for use in determining the elastic center. First is a translational transformation $T_i$ for translating an elastic element a distance {q, r, s} in the {x, y, z} directions:

$$T_i = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & -s & r & 1 & 0 & 0 \\ s & 0 & -q & 0 & 1 & 0 \\ -r & q & 0 & 0 & 0 & 1 \end{pmatrix} \quad (4)$$

Also, a series of rotation transformations (Euler angles) may be utilized to represent rotations $\theta_1$ about the y axis, $\psi_1$ about the x axis, and $\phi_1$ about the z axis:

$$R_\theta = \begin{pmatrix} \cos[\theta_1] & 0 & -\sin[\theta_1] & 0 & 0 & 0 \\ 0 & 1 & 0 & 0 & 0 & 0 \\ \sin[\theta_1] & 0 & \cos[\theta_1] & 0 & 0 & 0 \\ 0 & 0 & 0 & \cos[\theta_1] & 0 & -\sin[\theta_1] \\ 0 & 0 & 0 & 0 & 1 & 0 \\ 0 & 0 & 0 & \sin[\theta_1] & 0 & \cos[\theta_1] \end{pmatrix} \quad (5)$$

$$R_\psi = \begin{pmatrix} 1 & 0 & 0 & 0 & 0 & 0 \\ 0 & \cos[\psi_1] & \sin[\psi_1] & 0 & 0 & 0 \\ 0 & -\sin[\psi_1] & \cos[\psi_1] & 0 & 0 & 0 \\ 0 & 0 & 0 & 1 & 0 & 0 \\ 0 & 0 & 0 & 0 & \cos[\psi_1] & \sin[\psi_1] \\ 0 & 0 & 0 & 0 & -\sin[\psi_1] & \cos[\psi_1] \end{pmatrix} \quad (6)$$

$$R_\varphi = \begin{pmatrix} \cos[\varphi_1] & \sin[\varphi_1] & 0 & 0 & 0 & 0 \\ -\sin[\varphi_1] & \cos[\varphi_1] & 0 & 0 & 0 & 0 \\ 0 & 0 & 1 & 0 & 0 & 0 \\ 0 & 0 & 0 & \cos[\varphi_1] & \sin[\varphi_1] & 0 \\ 0 & 0 & 0 & -\sin[\varphi_1] & \cos[\varphi_1] & 0 \\ 0 & 0 & 0 & 0 & 0 & 1 \end{pmatrix} \quad (7)$$

$$R_i = R_\theta \cdot R_\psi \cdot R_\varphi \quad (8)$$

The explanation is now continued with respect to a hypothetical system having four identical isolators symmetrically spaced about a mount. The system stiffness matrix for such a system is formed by summing all elastic elements after a similarity transformation of each element. The similarity transformation is given as follows:

$$Q_i = T_i \cdot R_i \quad (9)$$

Performing the transformation for the elastic elements $K_1$, $K_2$, $K_3$, and $K_4$:

$$K_1 = Q_1 \cdot K_1 \cdot \text{Transpose}(Q_1) \quad (10)$$

$$K_2 = Q_2 \cdot K_2 \cdot \text{Transpose}(Q_2) \quad (11)$$

$$K_3 = Q_3 \cdot K_3 \cdot \text{Transpose}(Q_3) \quad (12)$$

$$K_4 = Q_4 \cdot K_4 \cdot \text{Transpose}(Q_4) \quad (13)$$

The system stiffness matrix $K_t = K_1 + K_2 + K_3 + K_4$. The elastic center condition is given as $K_t(4, 2) = K_t(4, 3) = K_t(5, 5) = 0$. By inspection of the relationship of the 6×6 stiffness matrix to the forces and deflections, it will be seen that the upper right 3×3 sub-matrix and the lower left 3×3 sub-matrix will vanish if there is to be no coupling between the translational loads and the rotational response of the system. Ideally a coordinate transformation would be found that accomplishes this goal. However no transformation can be found in general to meet this requirement. The most that can be accomplished is to have these sub-matrices be symmetric. This can be appreciated by observing that a coordinate transformation alone cannot reduce the diagonal terms of the sub-matrices (i.e., the (4,1), (5,2), and (6,3) elements) to zero. The isolation system starts with these terms zero to begin with.

From symmetry considerations this situation can be reduced to a system with three degrees of freedom (translation in the x- and y-directions, and rotation about the z-axis). This leads to a matrix such as the following:

$$K_3 = \begin{pmatrix} 4\left(a\cos^2[\theta] + \sin^2[\theta]\right) & 0 & 0 \\ 0 & 2\left(b - \cos^2[\theta] + a\sin^2[\theta]\right) & -2p\left(\cos^2[\theta] + a\sin^2[\theta]\right) - (-1-a)q\sin[2\theta] \\ 0 & -2p\left(\cos^2[\theta] + a\sin^2[\theta]\right) - (-1-a)q\sin[2\theta] & \begin{matrix} 2q^2\left(a\cos^2[\theta] + \sin^2[\theta]\right) - \\ (-1-a)pq\sin[2\theta] - \\ p\left(-2p\left(\cos^2[\theta] + a\sin^2[\theta]\right) - \\ (-1+a)q\sin[2\theta]\right) \end{matrix} \end{pmatrix} \quad (14)$$

Here the distances p (FIG. 2) need to be chosen to make the coupling term of the stiffness matrix $K_3(2, 3)$ vanish. This condition may be represented as follows:

$$0 = -2p(b + \cos^2[\theta] + a\sin^2[\theta]) - (-1-\alpha)q\sin[2\theta] \quad (15)$$

The solution to Equation (15) provides the location of the elastic center p, as a function of a, b, q, and $\theta$. The elastic center is the point that the stiffness matrix is diagonal. A similar process can be used for any number of elements. The system need not be symmetric but the calculations are simplified.

It is convenient to transform the stiffness matrix to the elastic center for the remaining calculations. From Equation (15), the elastic center distance p can be expressed as follows:

$$p(a, b, q, \theta) = \frac{(-1+a)q\sin[2\theta]}{2(b + \cos^2[\theta] + a\sin^2[\theta])} \quad (16)$$

Using this expression, the stiffness matrix may be expressed as:

$$K_3 = \begin{pmatrix} 4\left(a\cos^2[\theta] + \sin^2[\theta]\right) & 0 & 0 \\ 0 & 2\left(b - \cos^2[\theta] + a\sin^2[\theta]\right) & 0 \\ 0 & 0 & \frac{1}{2}q^2 \frac{4\left(a\cos^2[\theta] - \sin^2[\theta]\right) - (-1-a)^2\sin^2[2\theta]}{b - \cos^2[\theta] - a\sin^2[\theta]} \end{pmatrix} \quad (17)$$

Since this matrix is diagonal, the flexibility matrix [A], the inverse of the stiffness matrix, is just the inverse of the diagonal elements from Equation (17). The static equilibrium solution is a situation in which:

$$\{\text{Displacement Vector}\} = [A]\{\text{Force Vector}\} \quad (18)$$

Referring again to FIG. 2, a lateral force $F_y$ is applied at location s. The lateral displacement $y_s$ and the rotation $\alpha_s$ of the body about the z-axis, both at location s, become:

$$y_s = (A_{yy} + S^2 A_{aa}) F_y \quad (19)$$

$$\alpha_s = -s A_{aa} F_y \quad (20)$$

The displacement $y_s$ is in the positive (+Y) direction. However displacement caused by rotation $\alpha_s$ above the point of force application (father from the base 18) is in the negative (−Y) direction. At some location r, above the location s, the two components balance, and the net displacement is zero:

$$0 = r\alpha_s + y_s \quad (21)$$

Substituting in the other equations, this leads to a determination of the location r of zero lateral displacement due to the lateral force F:

$$r = (A_{yy} + S^2 A_{aa})/(s A_{aa}) \quad (22)$$

Figure 3:
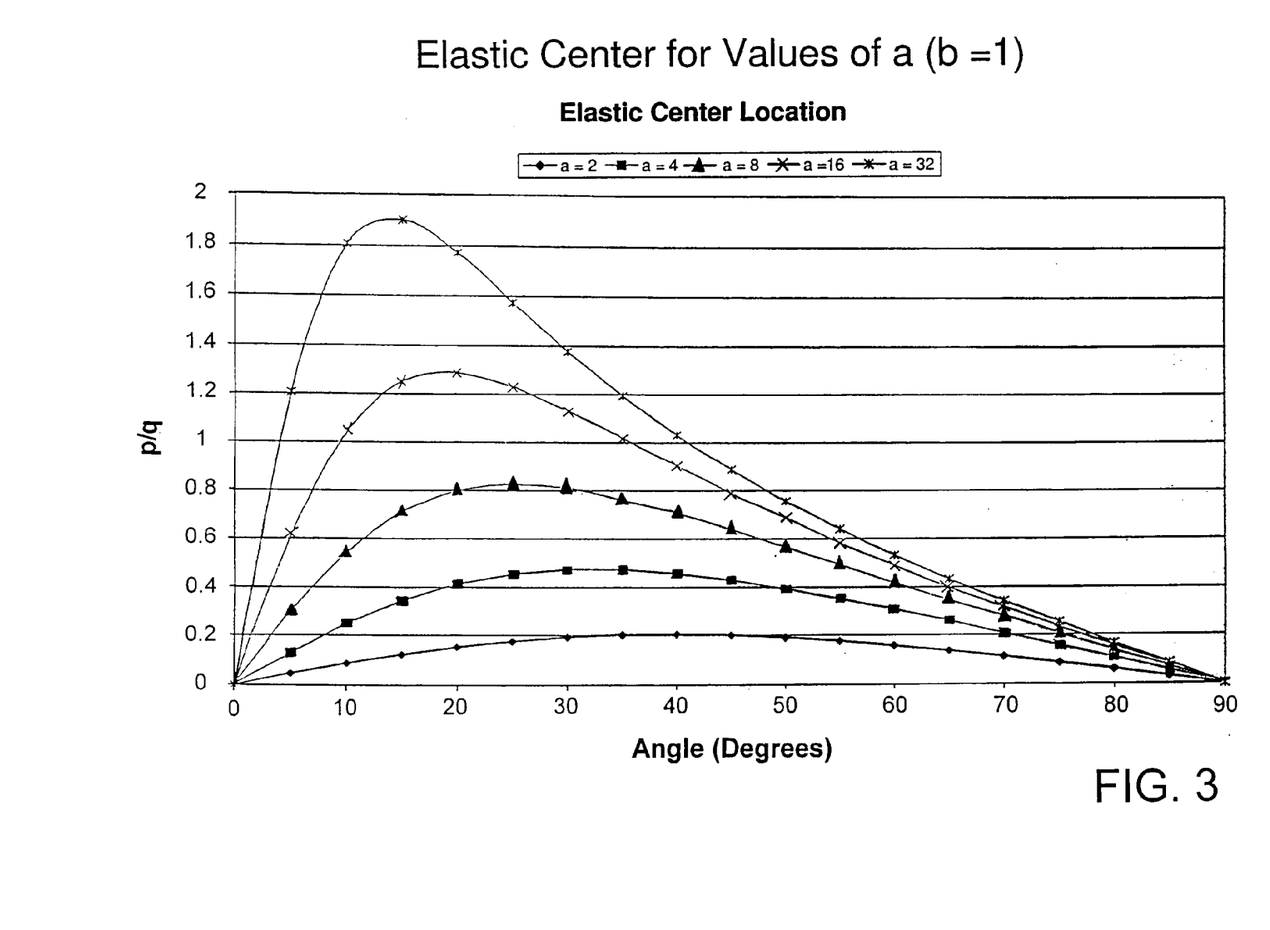
FIG. 3 is a graph showing location of the elastic center of a mount as a function of material characteristics and angle of isolators, for an example embodiment.

Results for the ratio of height of elastic center to lateral location of the isolators are shown as a function of angle in FIG. 3, for several values of ratio of isolator compression to shear stiffness. The tangential to shear stiffness ratio is the same (b=1) for all of the plots in FIG. 3. As the compression to shear stiffness ration increases, two trends are evident from FIG. 3. First of all, the elastic center may be located at a greater and greater height away from the location of the isolators. In addition, the angle of the isolators needed to achieve the maximum height of the elastic center goes down with increasing a. For larger values of the ratio a, the elastic center may be located at a height much greater than the separation between the isolators.

The derivation given above, and the results shown in FIG. 3, are only examples. It will be appreciated that more complicated systems, even non-symmetric systems, may be analyzed to determine the location of the elastic center. With this analysis, the material and location of the isolators may be selected in order to place the elastic center at a desired location. As discussed earlier, the location of the elastic center may be above a center of mass or gravity of the object 16 (FIG. 1), may be substantially at the height of the narrowest gap 30 (FIG. 1) between the object 16 and the structure or housing 26 (FIG. 1) around the object 16, and/or may be at a location fully above the object 16.

Figure 4:
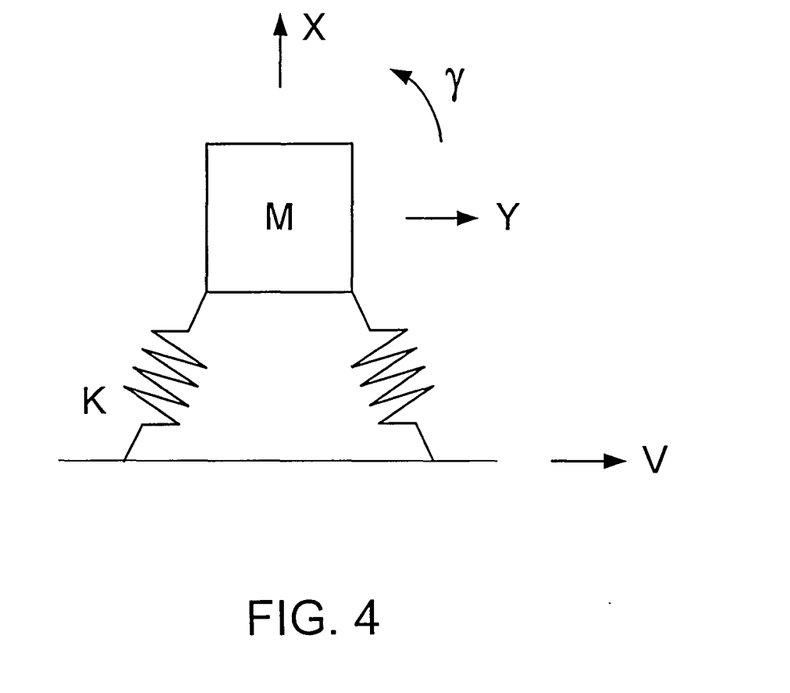
FIG. 4 is a schematic view of a dynamic system, showing a mass, a flexible support, and a coordinate system, in accordance with an embodiment of the present invention.

The derivation given above can be extended to situations where a base moves harmonically. The transfer functions can be used for a random or transient motion environment, so this discussion will cover all dynamic environments. With reference to FIG. 4, the problem is to determine the center of rotation for such a dynamic system, with an object having mass M mounted to a base B, using isolators with stiffness K. X- and Y-coordinates are defined with respect to the center of mass of the of the object, and the a V-coordinate is defined with respect to the base. Now let the base motion be harmonic and represented by:

$$V = \tilde{V}_0 e^{i\omega t} \quad (23)$$

where $\tilde{v}_0$ is a complex constant. A relative coordinate Z is defined as follows:

$$Z = Y - V \quad (24)$$

The relative coordinates are used to find the center of rotation for the relative motion to avoid interference with a structure that is attached to the base.

The equations for motion for the system are:

$$[M][\ddot{Z}] + [K][Z] = -[M][\ddot{V}] \quad (25)$$

where the solution is assumed to be of the form:

$$[Z] = [\tilde{Z}_0] e^{i\omega t} \quad (26)$$

It is convenient to rewrite the equation of motion (Eq. (25)), in terms of the flexibility matrix at the elastic center, $[A] = [K]^{-1}$, and the distance S from the center of gravity to the center of elasticity. The resulting equation is $$[I - \omega^2 AM][\tilde{Z}_0] = \omega^2 [AM][\tilde{V}_0] \quad (27)$$

where $I_{cg}$ is the moment of inertia of the object about the center of gravity. The matrix terms on the right side of Eq. (27) are:

$$\omega^2 [AM] = \omega^2 \begin{bmatrix} M(A_{yy} + S^2 A_{aa}) & 0 & ISA_{aa} \\ 0 & MA_{xx} & 0 \\ MSA_{aa} & 0 & IA_{aa} \end{bmatrix} \quad (28)$$

and the matrix terms on the left side of Eq. (27) are:

$$[I - \omega^2 AM] = \begin{bmatrix} 1 - \omega^2 M(A_{yy} + S^2 A_{aa}) & 0 & -\omega^2 I_{cg} SA_{aa} \\ 0 & 1 - \omega^2 MA_{xx} & 0 \\ -\omega^2 MSA_{aa} & 0 & 1 - \omega^2 I_{cg} A_{aa} \end{bmatrix} \quad (29)$$

Using similar procedures as outlined above in the static case, where the location of the center of rotation, $R(\omega)$, is now a function of the frequency $\omega$ of oscillations in the base:

$$R(\omega) = \frac{A_{yy}(1 - A_{aa} I_{cg} \omega^2) + A_{aa} S^2}{A_{aa} S[1 + A_{yy} M \omega^2 + A_{aa} \omega^2 (MS^2 - I_{cg})]} \quad (30)$$

Note that for the static case, $\omega=0$, the result is the same as that given above in Eq. (22). One would usually evaluate the above equation at the natural frequencies of the system, but the amplitude is dependent on the environment and must evaluated on a case by case basis.

Damping can be easily added by representing the stiffness as complex;

$$\tilde{K} = K \left[ 1 + i\eta + i2\xi \frac{\omega}{\omega_R} \right] \quad (31)$$

where $\eta$ and $\xi$ are the well known material and viscous damping coefficients.

Figure 5:
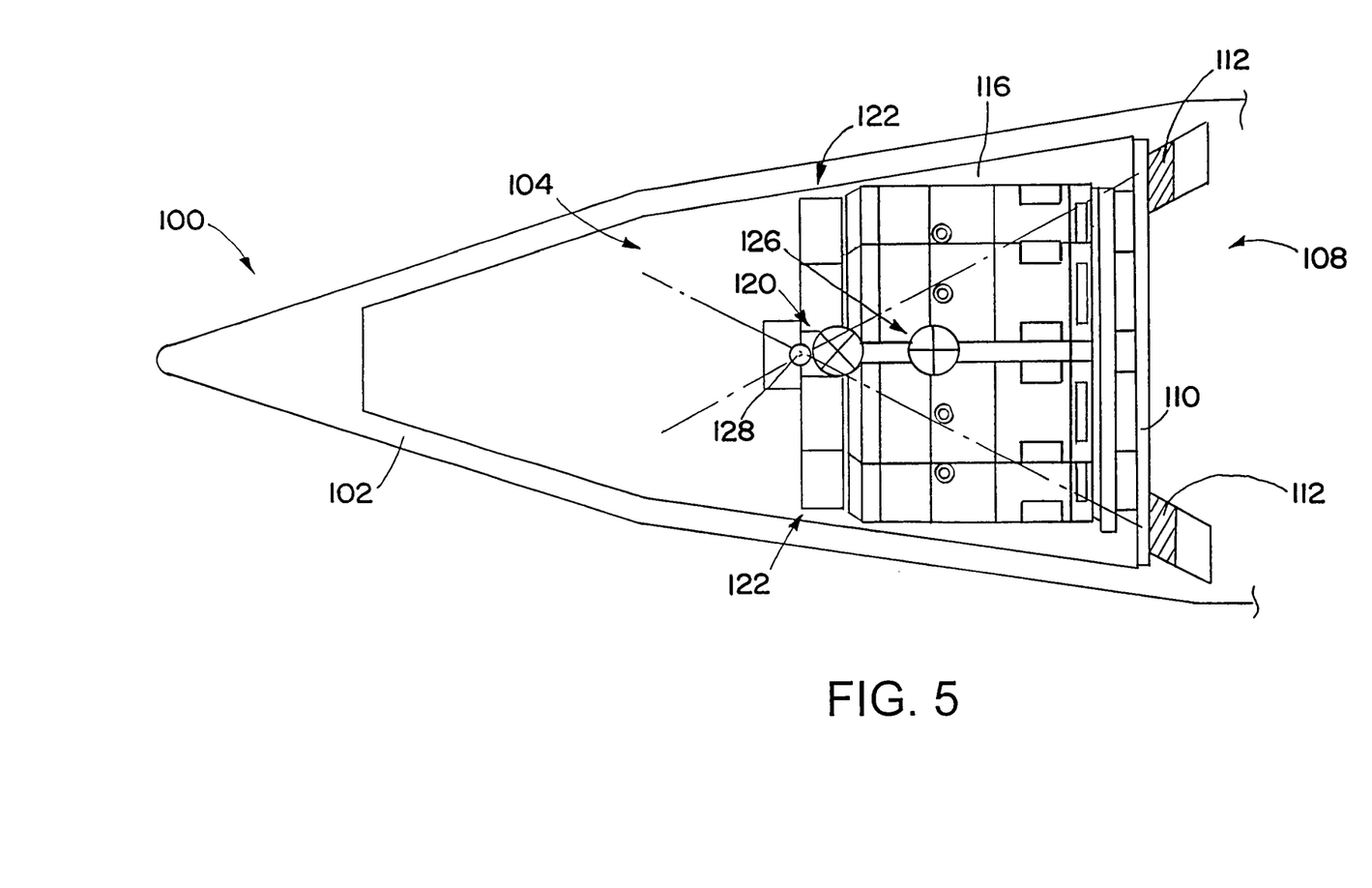
FIG. 5 is a cutaway view of an example mounting system, a missile nose.

FIG. 5 shows a missile upper stage (nose cone and contents) 100 that is configured as described earlier. The missile upper stage 100 has an ogive nose cone 102 that defines an interior payload envelope 104. A mount 108, including a mounting plate 110 and isolators 112, is used to secure a payload 116 within the envelope 104. The mount 108 provides the primary structural anchor for the payload 116. The payload 116 shown in FIG. 4 is a series of secondary munitions, but it will be appreciated that the payload 116 may be any of a variety of many other types of cargo for the missile nose 100. The secondary munitions of the payload 116 may be considered as a single object attached to the mounting plate 110.

The isolators 112 are configured as discussed above, to place an elastic center 120 of the flexible mount 108 at a distance away from the plate 110, and to place a center of rotation 128 at or near a distance that corresponds to a minimum gap 122 between the payload 116 and the ogive nose cone 102. This is further from the plate 110 than the center of gravity or mass 126 of the payload 116. This configuration advantageously minimizes, ideally to zero, the lateral swaying motion in the area of the minimum gap 122. More lateral motion is permitted closer to the plate 110, where there is naturally greater clearance between the payload 116 and the ogive nose cone 102. The payload 116 acts in some ways as an inverse pendulum rotating about the elastic center 120. Placement of the elastic center 120 such that the center of rotation is at the same level as the minimum gap 122 allows greater utilization of volume of the nose cone envelope 104. Denser packaging may be allowed, since controlling the location of the elastic center 120 minimizes the need to provide larger gaps around various areas of the payload 116. In addition, design configuration of the mount 108 may be streamlined, substituting analysis for trial-and-error experimentation.

The mounting systems and methods described herein may be particularly useful in situations where the payload is attached at a wide end of an envelope in which an object is placed, and where the minimum gap is at or near a distal end away from the location of attachment. However, it will be appreciated that the mounting systems and methods are of far more general applicability.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of configuring a flexible mount for receiving an object to be mounted, the method comprising:
    choosing a desired location of least sway for the mount; and
    configuring isolators of the mount to locate a center of elasticity of the flexible mount such that a center of rotation point of the mount, where there is zero net lateral motion, is at the location of least sway, wherein the configuring includes using an equation that relates a location of the center of elasticity and the center of rotation point as a function of material characteristics of the isolators.

2. The method of claim 1, wherein the equation also relates the location of the center of elasticity and the center of rotation point as a function of inclination angle of the isolators.

3. The method of claim 2, wherein the configuring the isolators includes configuring the inclination of the isolators relative to a base of the mount.

4. The method of claim 1, wherein the equation also relates the location of the center of elasticity and the center of rotation point as a function of stiffness ratios of materials of the isolators.

5. The method of claim 1, wherein the choosing the desired location includes choosing a location farther from the mount than a center of mass of the object to be mounted to the mount.

6. The method of claim 1, wherein the choosing the desired location includes choosing a location farther from the mount than a distal end of the object to be mounted to the mount.

7. The method of claim 1, wherein the choosing the desired location includes choosing a location that is substantially as far from the mount as a location of least clearance between object and structure around the object.

8. The method of claim 1, wherein the object to be mounted is a payload of a missile nose, to be mounted at an aft end of an ojive missile nose cone.

9. The method of claim 1, wherein the choosing the desired location of least sway to be a desired location of least sway due to lateral forces that have a component parallel to a base of the mount.

* * * * *